Patented Oct. 24, 1950

2,527,506

UNITED STATES PATENT OFFICE 2,527,506

ETHERS

George L. Doelling, St. Louis, and Kenneth H. Adams, Fenton, Mo., assignors to Mississippi Valley Research Laboratories, Inc., St. Louis, Mo., a corporation of Missouri No Drawing. Application July 30, 1947, Serial No. 764,926

11 Claims. (Cl. 260—613)

This invention relates to ethers and more particularly to polyethylene glycol bis (nitrophenyl) ethers.

Among the several objects of this invention may be noted the provision of new and useful polyethylene glycol bis (nitrophenyl) ethers and derivatives thereof; and, the provision of such ethers and derivatives thereof which are useful as high boiling solvents and as plasticizers for plastic and polymeric materials. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

According to the present invention new and useful polyethylene glycol bis (nitrophenyl) ethers and derivatives of such ethers are provided. More particularly the invention relates to polyethylene glycol bis (nitrophenyl) ethers having the following general structural formula:

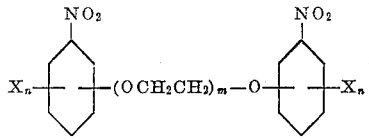

In which X represents chlorine or bromine, $m$ is an integer greater than three and less than thirty, and $n$ is an integer from zero to three inclusive. The —$(OCH_2CH_2)_m$—O—group may be substituted in any position in the nitrophenyl nucleus not otherwise occupied. The chlorine or bromine may be similarly substituted.

The ethers of the present invention and the derivatives thereof, represented by the foregoing formula, include polyethylene glycol bis (nitrophenyl) ethers and their derivatives which have one or more methyl, ethyl, isopropyl, etc. groups substituted for hydrogen in one or both of the nitrophenyl nuclei.

Among the ethers of the present invention are nonaethylene glycol bis (paranitrophenyl) ether, hexaethylene glycol bis (paranitrophenyl) ether, tetraethylene glycol bis (paranitrophenyl) ether, tridecaethylene glycol bis (paranitrophenyl) ether, tridecaethylene glycol bis (orthonitrophenyl) ether, docosaethylene glycol bis (paranitrophenyl) ether, hexaethylene glycol bis (2-chloro-4-nitrophenyl) ether, tridecaethylene glycol bis (chloronitrotolyl) ether, nonaethylene glycol bis (4-bromo-2-nitrophenyl) ether, nonaethylene glycol bis (4-chloro-2-nitrophenyl) ether, hexaethylene glycol bis (dichloronitrophenyl) ether, nonaethylene glycol bis (dichloronitrophenyl) ether, tridecaethylene glycol bis (2-chloro-4-nitrophenyl) ether, docosaethylene glycol bis (4-chloro-2-nitrophenyl) ether and tridecaethylene glycol bis (dichloronitrophenyl) ether.

The ethers of the present invention may, in most instances, be conveniently made by the reaction of a halonitrobenzene and a polyalkylene glycol. In general the halonitrobenzene is mixed with the proper polyalkylene glycol, the mixture is heated to a temperature not over 100° C., a current of oxygen or an oxygen containing gas is passed through or over the solution and an alkaline material is added, preferably in a number of portions as the reaction progresses, in order to avoid having a high concentration of alkali in the solution at any time during the reaction. To make these polyethylene glycol bis (nitrophenyl) ethers the molar ratio of halonitrobenzene to polyalkylene glycol is preferably maintained at a ratio of at least 2:1.

For best results the concentration of alkali in the reaction mixture during the reaction should be kept less than 1.0 normal, and we prefer to keep it 0.5 normal or less; that is, 1 milliliter of the reaction mixture when titrated in an aqueous acetone solution to phenolphthalein indicator, should preferably take not over 1 milliliter of 0.5 normal HCl solution to neutralize it.

The oxygen or oxygen containing gas is preferably passed into the reaction mixture throughout the reaction in order to keep an appreciable amount of oxygen in solution at all times. Keeping oxygen or an oxygen containing gas under pressure over the solution also aids in keeping an appreciable amount of oxygen in solution in the reaction mixture. This prevents reduction of the nitro group to azoxy or other reduction products.

The reaction mixture should preferably be stirred during the entire run and we prefer to run the reaction at the lowest temperature at which a reasonably rapid rate of reaction will occur in any given case. This rate of reaction can be determined from titration of samples taken out at intervals. As can be seen from the subsequent examples, we prefer a temperature from 35° C. to 85° C., though higher temperatures can be used. At too high a temperature, over about 100° C., the tendency to reduction and side reactions is very great in most cases.

The ethers of the present invention are useful plasticizers for plastic and polymeric materials such as the cellulose esters and ethers and the phenol formaldehyde condensation products.

The following examples illustrate the invention:

Example 1

Nonaethylene glycol bis (paranitrophenyl) ether, having the formula:

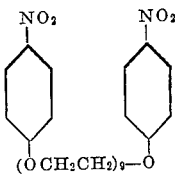

was made from paranitrochlorobenzene and nonaethylene glycol, as follows:

|  | Weight | Mols |
| --- | --- | --- |
|  | Grams |  |
| Paranitrochlorobenzene | 165.4 | 1.05 |
| Nonaethylene glycol | 160 | .40 |
| Potassium hydroxide (90% flakes) | 60 | .96 |

The nitrochlorobenzene and the nonaethylene glycol were charged into a 500 milliliter, 3-neck, round-bottomed flask equipped with a reflux condenser, a mechanical stirrer and an inlet tube for oxygen. The materials were heated to about 55° C. and then a slow stream of oxygen gas was bubbled continuously through the batch during the entire run, to prevent reduction of the nitro group. Then with oxygen going through and the stirrer running, 6 grams of potassium hydroxide were added. At a temperature of 55° to 60° C. the remainder of the alkali was added in 6 gram portions over a period of about 5 hours. The addition of the alkali was at about the same rate as it was used up in the reaction, as determined by removing samples at intervals and titrating the free alkali present in the batch. A 1 milliliter sample of the batch titrated from zero to about 5 milliliters of .1N HCl to phenolphthalein at various times during the run. Total time of reaction was about 6½ hours.

The batch was worked up by diluting with water and then extracting with a mixture of benzene and isopropyl ether. The combined extracts were washed several times with water. After removal of solvent the excess nitrochlorobenzene was distilled off under a vacuum of about 2 millimeters. The product was a reddish-amber, rather viscous oil. Its molecular weight by the camphor method was 647 against 642, the theoretical value for this compound. It is soluble in alcohol and acetone but is soluble in water only to the extent of about 0.13% by weight at 25° C.

This product is useful as a cellulose nitrate plasticizer. Ten grams of cellulose nitrate and 10 grams of the nonaethylene glycol bis (paranitrophenyl) ether were dissolved in 100 milliliters of a mixture of equal parts of absolute ethyl alcohol and n-butyl acetate. This solution was then floated onto a glass slide and the solvent evaporated off. A clear film resulted which remained clear. This ether is also compatible with cellulose acetate up to 25% or more of the weight of the cellulose acetate.

Example 2

Hexaethylene glycol bis (paranitrophenyl) ether, having the formula:

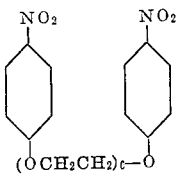

was made from paranitrochlorobenezene and hexaethylene glycol in a manner similar to Example 1. The product was a rather viscous reddish-amber oil which had approximately the correct molecular weight for this compound. It was found to be soluble in alcohol, benzene and other common solvents, but in water only to the extent of about .08% by weight at 25° C.

This ether is useful as a plasticizer for cellulose nitrate. A solution was made up of 100 milliliters of a mixture of equal amounts of absolute ethyl alcohol and n-butyl acetate, 10 grams of cellulose nitrate and 10 grams of the hexaethylene glycol bis (paranitrophenyl) ether. Some of this solution was floated onto a glass slide and the solvent allowed to evaporate. The resulting film was clear and remained clear after exposure to the air, showing that this ether is compatible with cellulose nitrate over a wide range of proportions. This ether was also found to be compatible with cellulose acetate in the proportion of about 20% of the weight of the cellulose acetate.

Example 3

Tetraethylene glycol bis (paranitrophenyl) ether, having the formula:

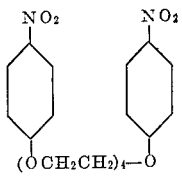

was made from paranitrochlorobenzene and tetraethylene glycol in a manner similar to Example 1. The yield of product was 162 grams from 80 grams of tetraethylene glycol. This product was found to have a molecular weight of 448 against 442, the theoretical value for this compound. Its solubility in water at 25° C. was about .02% by weight.

This ether is useful as a plasticizer for cellulose nitrate and cellulose acetate. In our tests this tetraethylene glycol bis (paranitrophenyl) ether was found to be compatible with cellulose nitrate up to 100% or more of the weight of cellulose nitrate. It is also compatible with cellulose acetate up to 20% or 25% of the weight of cellulose acetate.

Example 4

The bis (paranitrophenyl) ether of polyethylene glycol corresponding approximately to the formula:

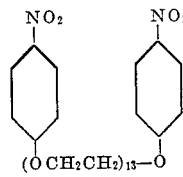

was made from paranitrochlorobenzene and a polyethylene glycol having a molecular weight of approximately 600. From 180 grams of such polyethylene glycol a yield of 231 grams of this ether were secured. The product had approximately the correct molecular weight and was soluble in water to the extent of about .32% by weight at 25° C. It was a rather viscous reddish-brown oil.

The bis (orthonitrophenyl) ether of the same polyethylene glycol was also made and had properties very similar to the para compound.

*Example 5*

The bis (paranitrophenyl) ether of polyethylene glycol corresponding approximately to the formula:

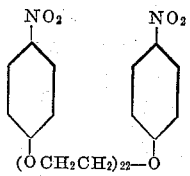

was made from parachloronitrobenzene, a polyethylene glycol having a molecular weight of approximately 1000 and potassium hydroxide. The reaction was run at 70° to 72° C. for about 6 hours. The product recovered in the usual manner from this reaction-mixture, was a rather viscous amber oil, soluble in alcohol and acetone but soluble in water only to the extent of about 1.1% by weight at 25° C.

*Example 6*

Hexaethylene glycol bis (2-chloro-4-nitrophenyl) ether having the formula:

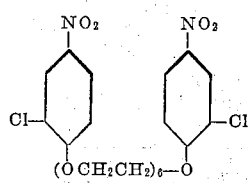

was made from hexaethylene glycol and 3,4-dichloronitrobenzene, in a manner similar to Example 1, as follows:

|  | Weight | Mols |
|---|---|---|
|  | Grams |  |
| 3,4-Dichloronitrobenzene | 152 | .79 |
| Hexaethylene Glycol | 90 | .30 |
| Potassium hydroxide (90% flakes) | 41 | .66 |

The product weighed 151 grams and was a rather viscous, reddish oil. It was soluble in alcohol, benzene and ketones but soluble in water only to the extent of about .008% by weight at 25° C.

This product is useful as a plasticizer. A solution was made up of 10 grams of cellulose nitrate, 10 grams of the hexaethylene glycol bis (2-chloro-4-nitrophenyl) ether, and 100 milliliters of equal parts of absolute ethyl alcohol and n-butyl acetate. Some of this solution was floated onto a glass slide and the solvent evaporated off. The resulting film was clear and remained clear. This ether is highly compatible with cellulose nitrate.

This ether is also compatible with phenolformaldehyde resins to a considerable degree. Ten grams of "Resinox" (a phenol-formaldehyde condensation polymer) molding resin and 5 grams of the hexaethylene glycol bis (2-chloro-4-nitrophenyl) ether were dissolved in 50 milliliters of a mixture of equal volumes of ethyl alcohol and methyl ethyl ketone. A small amount of this solution after filtering was floated onto a glass slide and the solvent evaporated. This left a clear film and after heating the film at about 140° C. for 20 minutes the film was still clear. A similar test was made with 25% of the weight of resin of this same ether, giving about the same result. The plasticized resin is less brittle after curing than when no plasticizer is used.

*Example 7*

The polyethylene glycol bis (chloronitrotolyl) ether, corresponding approximately to the formula:

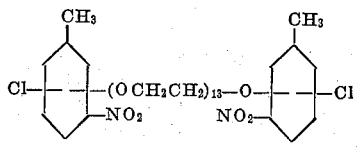

was made from 2,6-dichloro-3-nitrotoluene and a polyethylene glycol having a molecular weight of approximately 600 in a manner similar to Example 6.

The product was a viscous reddish oil soluble in alcohol, acetone and benzene but practically insoluble in water.

*Example 8*

Nonaethylene glycol bis (4-bromo-2-nitrophenyl) ether, having the formula:

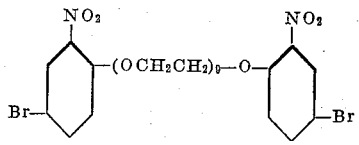

was made from 2,5-dibromonitrobenzene and nonaethylene glycol in a manner similar to Example 6.

The product was a reddish oil which had approximately the correct molecular weight for this compound. It was soluble in alcohols and ketones but practically insoluble in water.

*Example 9*

Nonaethylene glycol bis (4-chloro-2-nitrophenyl) ether, having the formula:

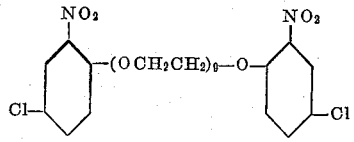

was made from 2,5-dichloronitrobenzene and nonaethylene glycol in a manner similar to Example 6.

A yield of 203 grams was secured from 120 grams of nonaethylene glycol. The product was a rather viscous, reddish-amber oil. It had approximately the correct molecular weight for this compound and was soluble in alcohols and ketones but was soluble in water only to the extent of about .02% by weight at 25° C.

*Example 10*

Hexaethylene glycol bis (dichloronitrophenyl) ether, having the formula:

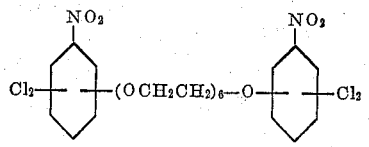

was made from 2,4,5-trichloronitrobenzene and hexaethylene glycol in a manner similar to Example 6. In this case though the reaction was carried out at 46° C. to 48° C. and the time of reaction was only 4½ hours. The product had about the correct molecular weight for this compound and consisted of a rather viscous dark-red oil. This compound was soluble in water only to the extent of .008% by weight at 25° C. but it was soluble in alcohols and ketones.

This ether is useful as a cellulose nitrate plasticizer. Tests have shown that it is compatible in a ratio at least up to 100% of the weight of the cellulose nitrate.

*Example 11*

The bis (dichloronitrophenyl) ether of nonaethylene glycol corresponding approximately to the formula:

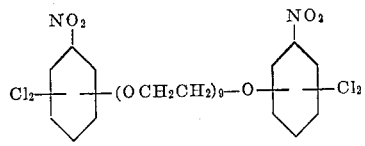

was made from nonaethylene glycol and 2,4,5-trichloronitrobenzene as follows:

|  | Weight | Mols |
| --- | --- | --- |
|  | Grams |  |
| 2,4,5-Trichloronitrobenzene | 136 | 0.60 |
| Nonaethylene Glycol | 100 | .25 |
| Sodium hydroxide | 22 | .55 |

This ether was prepared in a manner similar to Example 1. The temperature of reaction was 49° C. to 51° C. and time of reaction was about 5 hours. The product was isolated in the usual manner, except that in the vacuum distillation of the excess trichloronitrobenzene a current of $CO_2$ was run through to aid in the removal of this product. This ether was an amber oil weighing 193 grams or about 99% of theory yield. It is soluble in most organic solvents except petroleum hydrocarbons.

*Example 12*

The bis (2-chloro-4-nitrophenyl) ether of polyethylene glycol corresponding approximately to the formula:

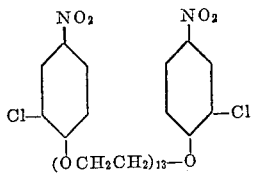

was made from 3,4-dichloronitrobenzene, a polyethylene glycol having a molecular weight of approximately 600 and sodium hydroxide, in a manner similar to Example 1. The reaction temperature was 56° C. to 57° C. and the time of reaction was about 6¼ hours. Air was passed through the reaction mixture during the reaction. The product recovered in the usual manner was an amber colored oil weighing 245 grams (from 180 grams of the polyethylene glycol used). This ether is soluble in alcohols, acetone and other solvents but is soluble in water only to the extent of .05% by weight at 25° C.

*Example 13*

The bis (4-chloro-2-nitrophenyl) ether of polyethylene glycol corresponding approximately to the formula:

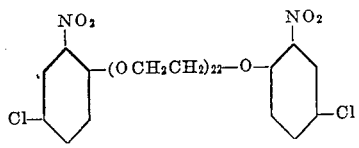

was made from 2,5-dichloronitrobenzene, a polyethylene glycol having a molecular weight of approximately 1000 and sodium hydroxide in a manner similar to previous examples. Air was bubbled through the reaction-mixture during the reaction. The temperature of reaction was 56° C. to 58° C. and the time of reaction was about 6 hours. The product was an amber-colored oil readily soluble in alcohol, acetone and many other solvents except petroleum hydrocarbons.

*Example 14*

The bis (dichloronitrophenyl) ether of polyethylene glycol corresponding approximately to the formula:

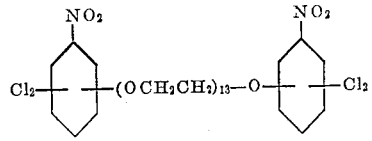

was made from 2,4,5-trichloronitrobenzene, a polyethylene glycol having a molecular weight of approximately 600, and sodium hydroxide in a manner similar to previous examples. Oxygen was bubbled through the reaction-mixture during the reaction. The temperature of reaction was 50° C. to 52° C. and the time of reaction was about 5½ hours.

Polyethylene glycol ethers containing fewer than four ethylene groups are unsuitable for use as plasticizers for plastic and polymeric materials. They are accordingly not within the purview of our invention.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A compound having the formula:

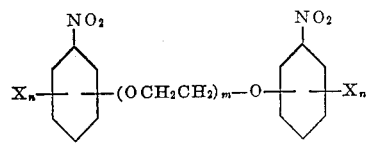

in which X represents a halogen selected from the group consisting of chlorine and bromine, m is an integer greater than three and less than thirty, and n is an integer including zero and not greater than three.

2. A compound having the formula:

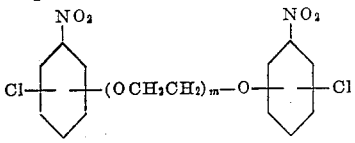

in which m is an integer greater than three and less than thirty.

3. A compound having the formula:

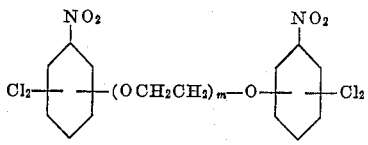

in which $m$ is an integer greater than three and less than thirty.

4. A compound having the formula:

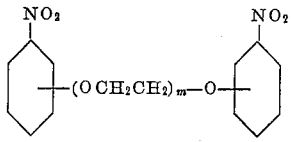

in which $m$ is an integer greater than three and less than thirty.

5. A compound having the formula:

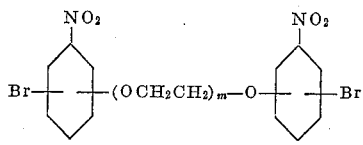

in which $m$ is an integer greater than three and less than thirty.

6. Hexaethylene glycol bis (paranitrophenyl) ether.

7. Hexaethylene glycol bis (2-chloro-4-nitrophenyl) ether.

8. Nonaethylene glycol bis (4-chloro-2-nitrophenyl) ether.

9. Hexaethylene glycol bis (dichloronitrophenyl) ether.

10. Tridecaethylene glycol bis (2-chloro-4-nitrophenyl) ether.

11. A compound having the formula:

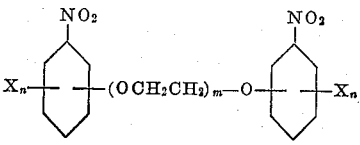

in which X represents a halogen selected from the group consisting of chlorine and bromine, $m$ is an integer between four and twenty-two, and $n$ is an integer including zero and not greater than three.

GEORGE L. DOELLING.
KENNETH H. ADAMS.

REFERENCES CITED

The following references are of record in the file of this patent:

UNITED STATES PATENTS

| Number | Name | Date |
|---|---|---|
| 2,189,338 | Bass et al. | Feb. 6, 1940 |
| 2,193,614 | Alexander | Mar. 12, 1940 |
| 2,196,576 | Coleman | Apr. 9, 1940 |
| 2,221,911 | Dickey | Nov. 19, 1940 |
| 2,266,737 | Bruson et al. | Dec. 23, 1941 |
| 2,280,722 | Schneider et al. | Apr. 21, 1942 |
| 2,286,314 | Seymour | June 16, 1942 |
| 2,291,528 | Bruson | July 28, 1942 |
| 2,331,090 | Gabel | Oct. 5, 1943 |
| 2,351,102 | Britton et al. | June 13, 1944 |